US009109976B2

(12) United States Patent
Gueu et al.

(10) Patent No.: US 9,109,976 B2
(45) Date of Patent: Aug. 18, 2015

(54) METHOD AND TOOL FOR MEASURING THE GEOMETRIC STRUCTURE OF AN OPTICAL COMPONENT (71) Applicant: ESSILOR INTERNATIONAL (COMPAGNIE GENERALE D'OPTIQUE), Charenton le Pont (FR)

(72) Inventors: Stéphane Gueu, Charenton le Pont (FR); Nicolas La Villonniere, Charenton le Pont (FR); Fabien Muradore, Charenton le Pont (FR); Asma Lakhoua, Charenton le Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 0 days.

(21) Appl. No.: 14/384,119

(22) PCT Filed: Mar. 8, 2013

(86) PCT No.: PCT/EP2013/054751
§ 371 (c)(1),
(2) Date: Sep. 9, 2014

(87) PCT Pub. No.: WO2013/132072
PCT Pub. Date: Sep. 12, 2013

(65) Prior Publication Data
US 2015/0055126 A1 Feb. 26, 2015

(30) Foreign Application Priority Data
Mar. 9, 2012 (EP) ..................................... 12290084

(51) Int. Cl.
*G01M 11/02* (2006.01)
*G01B 11/24* (2006.01)

(52) U.S. Cl.
CPC ............. *G01M 11/025* (2013.01); *G01B 11/24* (2013.01); *G01M 11/0264* (2013.01); *G01M 11/0271* (2013.01)

(58) Field of Classification Search
USPC .............. 356/124, 124.5, 126–127, 511–512, 356/601–614
See application file for complete search history.

(56) References Cited

U.S. PATENT DOCUMENTS 5,439,642 A * 8/1995 Hagmann et al. ............... 422/22
(Continued)

FOREIGN PATENT DOCUMENTS

DE       10 2004 047 531           5/2006
(Continued)

OTHER PUBLICATIONS

E.A. Barbosa et al., "Measurement of low-derivative surface lenses by two laser holography with $Bi_{12}TiO_{20}$ crystals", Applied Optics, Optical Society of America, vol. 48, No. 27, pp. 5114-5120, Sep. 20, 2009.

*Primary Examiner* — Sang Nguyen
(74) *Attorney, Agent, or Firm* — Cozen O'Connor (57) ABSTRACT

The subject of the present invention is a method and a system for measuring the geometric or optical structure of an optical component. In particular, the invention relates to a method for measuring the geometric structure of a component bounded by a first side (10) and a second side (20), said method comprising steps of: (S1) measuring a first signal (MS1) resulting from a first conversion of a first probe signal (PS1), by at least said first side (10); (S2) measuring a second signal (MS2) resulting from a second conversion of a second probe signal (PS2), by at least said second side (20); (S3) determining a third conversion making it possible to convert a first set of coordinates (R1) associated with the measurement of the first signal (MS1) to a second set of coordinates (R2) associated with the measurement of the second signal (MS2); (S10) estimating said first side (10) using the first signal (MS1), said first simulation and a first cost criterion (V1) quantifying a difference between the estimation (FS1) and the first signal (MS1); and (S20) estimating said second side (20) using the second signal (MS2), said second simulation, said third conversion and a second cost criterion (V2) quantifying a difference between the estimation (ES2) and the second signal (MS2).

19 Claims, 5 Drawing Sheets

(56) References Cited

U.S. PATENT DOCUMENTS

| | | | |
|---|---|---|---|
| 6,072,570 A * | 6/2000 | Chipman et al. | 356/124 |
| 6,256,098 B1 * | 7/2001 | Rubinstein et al. | 356/602 |
| 6,776,486 B2 * | 8/2004 | Steele et al. | 351/159.42 |
| 6,909,498 B2 * | 6/2005 | Devie et al. | 356/124 |
| 7,034,949 B2 * | 4/2006 | Horwitz | 356/512 |
| 7,573,643 B2 * | 8/2009 | Rubinstein et al. | 359/642 |
| 8,643,848 B2 * | 2/2014 | Suenaga | 356/511 |
| 2011/0134438 A1 | 6/2011 | Kato | |
| 2012/0013916 A1 | 1/2012 | Osaki | |
| 2012/0069349 A1 | 3/2012 | Suenaga | |

FOREIGN PATENT DOCUMENTS

| | | |
|---|---|---|
| EP | 2 228 623 | 9/2010 |
| FR | 2 813 391 | 3/2002 |
| JP | 2001 227908 | 8/2001 |

* cited by examiner

METHOD AND TOOL FOR MEASURING THE GEOMETRIC STRUCTURE OF AN OPTICAL COMPONENT

RELATED APPLICATIONS

This is a U.S. National stage of International application No. PCT/EP2013/054751 filed on Mar. 8, 2013.

This patent application claims the priority of European application no. 12290084.8 filed Mar. 9, 2012 the disclosure content of which is hereby incorporated by reference.

FIELD OF THE INVENTION

The present invention is related to a method and a system for measuring the geometric or optical structure of an optical component.

The method makes it possible to measure in an absolute manner the two faces of an optical component. Absolute measurement is intended to mean a measurement which does not require any prior knowledge of the component except for its refractive index. The measurement of faces is susceptible of numerous industrial applications. It is in particular useful in the ophthalmic field for the checking or the measurement of ophthalmic lenses; in this case, the making of complex faces requires the simultaneous determination of hundreds of coefficients.

BACKGROUND OF THE INVENTION

This section is intended to introduce the reader to the diverse aspects of the art, which may be related to various aspects of the present invention which are described and/or claimed hereinbelow. This discussion is considered to be useful for providing the reader with background information so as to facilitate a better understanding of the various aspects of the present invention. Consequently, it must be understood that these statements must be read in this light, and not as an exposition of the prior art.

EP-A-0 644 411 in the name of the applicant describes a reflection or transmission deflectometry tool. This tool allows the measurement by reflection or transmission of the geometric structure of an optical component. The principle of such a measurement tool is to illuminate the optical component to be measured by a radiation of known wavefront—in the simplest case a plane wave—and to measure the wavefront after reflection or transmission on the optical component to be measured. Measurement of the wavefront after reflection or transmission makes it possible to derive the geometric characteristics of the component to be measured.

It is thus known to determine the geometry of one face of the component; the geometry of the other face of the component being assumed known for the calculations. A need therefore exists for a measurement tool which makes it possible to determine the various characteristics of an optical component, and in particular of its two faces. Such a tool makes it possible in particular to effectively measure progressive ophthalmic lenses, by determining in an exact manner the shape of each of their two faces and by perfectly positioning one face with respect to the other without having to formulate any assumption about one of these faces.

FR-2 813 391 A1, also in the name of the applicant, describes a method for measuring the geometric structure of an optical component implementing a pair of measurements in transmission of an optical component. But the precision of the geometric structure reconstructed is not always satisfactory because each of the two measurements combines the effects of the two faces traversed. Also known is DE102004047531, where two interferometric measurements are implemented, one in reflection, the other in transmission, to determine a surface topography and an internal distribution of refractive index of a live organism (cell or group of cells). But in an implicit manner, to achieve an absolute result, which makes it possible to translate the measurement of phase variation of a reflected or transmitted optical wave, into a map of heights or of variations of refractive index, the measurement described by this document requires a priori knowledge of the topography or of the refractive index distribution of the organism.

Moreover, it is known to measure the faces of an optical component with the aid of a gauge with mechanical or optical probe operating point by point, face by face or simultaneously at a point of each of the two faces. But the duration of a measurement of a face is significant and it is still always difficult to position the measurement of the first face with respect to the second face. Furthermore a point by point measurement in general requires extremely precise means for displacing a (mechanical or optical) probe which render it relatively expensive as regards acquisition and servicing and difficult to deploy in on an industrial site.

SUMMARY OF THE INVENTION

One object of the present invention is to solve the aforementioned drawbacks and it proposes to determine the geometric structure of an optical component on the basis of two non-destructive measurements. At least one of these measurements operates in zonal mode or multipoint mode (as opposed to the "point-to-point" mode introduced above) and at least one of these measurements is carried out on a signal of one MS1 resulting from a transformation of a probe signal by a single one of the faces, and where each of these faces is unknown a priori. This determination is furthermore based on a numerical reconstruction of each of the faces of the component on the basis of said measurements.

A first aspect of the invention relates to a method for measuring the geometric structure of a component delimited by a first face 10 and a second face 20; said method comprising the steps of:

S1 Measurement of a first signal MS1 resulting from a first transformation of a first probe signal PS1 by said first face 10, a first simulation of said first transformation making it possible to obtain a first estimation ES1 of the signal resulting from said first transformation of the first probe signal PS1 by at least one first virtual face 11 which is known and positioned in a first measurement reference frame R1 in a manner identical to said first face 10 during the measurement of the first signal MS1;

S2 Measurement of a second signal MS2 resulting from a second transformation of a second probe signal PS2 by at least said second face 20, a second simulation of said second transformation making it possible to obtain a second estimation ES2 of the signal resulting from said second transformation of the second probe signal PS2 by at least one second virtual face 21 which is known and positioned in a second measurement reference frame R2 in a manner identical to said second face 20 during the measurement of the second signal MS2;

Where at least one of the measurements from among the measurement of the first signal MS1 and the measurement of the second signal MS2 is a zonal measurement;

S3 Determination of a third transformation making it possible to pass from the first reference frame R1 to the second reference frame R2;

S10 Estimation of said first face 10 carried out on the basis of the first signal MS1, of said first simulation and of a first cost function V1 quantifying a discrepancy between the estimation ES1 and the first signal MS1;

S20 Estimation of said second face 20 carried out on the basis of the second signal MS2, of said second simulation, of said third transformation and of a second cost function V2 quantifying a discrepancy between the estimation ES2 and the second signal MS2.

A second aspect of the invention relates to a system for measuring the geometric structure of a component delimited by a first face 10 and a second face 20; said system comprising:

a first measurement means MM1 for measuring a first signal MS1 resulting from a first transformation of a first probe signal PS1 by at least said first face 10, a first simulation of said first transformation making it possible to obtain a first estimation ES1 of the signal resulting from said first transformation of the first probe signal PS1 by at least one first virtual face 11 which is known and positioned in a first measurement reference frame R1 in a manner identical to said first face 10 during the measurement of the first signal MS1;

a second measurement means MM2 for measuring a second signal MS2 resulting from a second transformation of a second probe signal PS2 by at least said second face 20, a second simulation of said second transformation making it possible to obtain a second estimation ES2 of the signal resulting from said second transformation of the second probe signal PS2 by at least one second virtual face 21 which is known and positioned in a first measurement reference frame R2 in a manner identical to said second face 20 during the measurement of the second signal MS2;

Where at least one of said measurement means MM1, MM2 carries out a zonal measurement;

a means MD for determining a third transformation making it possible to pass from the first reference frame R1 to the second reference frame R2 a first calculation means CM1 configured to estimate said first face 10 on the basis of the first signal MS1, of said first simulation, of a first virtual face 11 and of a first cost function V1 quantifying a discrepancy between the first estimation ES1 and the first signal MS1;

a second calculation means CM2 configured to estimate said second face 20 on the basis of the second signal MS2, of said second simulation, of a second virtual face 21, of said third transformation and of a second cost function V2 quantifying a discrepancy between the second estimation ES2 and the second signal MS2.

The procedure according to an embodiment of the invention presents the advantage of carrying out a determination of the structure of a component which is very fast with respect to existing direct mechanical or optical measurement techniques (point-to-point gauging with mechanical or optical probe for example etc.). Advantageously, the at least one zonal or "multipoint" measurement (for example the measurement of the first signal) can, itself, result from a collection of a restricted number of elementary zonal measurements. These elementary zonal measurements each measure a first elementary signal resulting from a first transformation of the first probe signal PS1 by a zone of the first face 10. The whole set of zones covering the first face. In this case, a step of joining up the elementary zonal measurements is necessary. This makes it possible with one and the same measurement means MM1 to obtain an estimation of the first face which is more precise than when the zonal measurement is carried out in a single capture, the zonal measurement carried out by the collection of a restricted number of elementary zonal measurements remaining faster and simpler to implement than a point-to-point measurement.

Moreover, it is possible to implement the procedure according to an embodiment of the invention by employing two measurements carried out on each of the faces which are of very different nature. The first measurement is for example a measurement in reflection, the second measurement is carried out for example in transmission. But other geometries are possible such as reflection/reflection. Likewise, the first measurement is a deflectometry measurement based on reflection of fringes and the second measurement is a measurement, of the Hartmann type but alternatively the first measurement can equally well be a measurement of deformation of an optical signal reflected by the first face and the second measurement is a measurement of enlargement, or magnification, of an optical signal transmitted by the first and the second face.

Thus, the procedure according to an embodiment of the invention also presents the advantage of being able to be implemented on the basis of existing apparatuses configured to carry out measurements of faces but which do not comprise any calculation means for reconstructing these faces in a datum which is not tied to themselves.

A third advantage of the procedure according to an embodiment of the invention is related to the form in which the determination of the structure is produced: the steps of reconstructing the faces presented below employ a representation of the faces in an analytical form. Furthermore; the component's structure such as it is delivered by the procedure according to an embodiment of the invention possesses an analytical form: this is particularly suitable for the subsequent employment of the structure estimated in numerical simulation means.

A fourth advantage, of the procedure according to an embodiment of the invention resides in the excellent precision that it makes it possible to achieve in the evaluation of heights of the faces of the optical component whereas the amplitude of the height variation is significant and no knowledge of any of these faces is required a priori.

The various embodiments of the invention find applications in the measurement or the checking of machined parts: for example ophthalmic lenses. In this case, the making of complex faces requires the simultaneous determination of hundreds of coefficients.

BRIEF DESCRIPTION OF THE DRAWINGS

The invention will be better understood and illustrated by means of the embodiments and the examples of execution which follow, wholly without limitation, with reference to the appended figures in which.

DETAILED DESCRIPTION OF THE PREFERRED EMBODIMENTS

It is understood that the numerical values and the descriptions of the present invention have been simplified to illustrate the elements which are relevant for a clear understanding of the present invention, while eliminating, for the sake of clarity, numerous other elements found in the methods of measurement based on reconstructing the faces of an optical component. However, because these elements are well known in the prior art, a detailed discussion of these elements is not envisaged here. The present disclosure is directed toward all these variations and the modifications known to the person skilled in the art.

Figure 1:
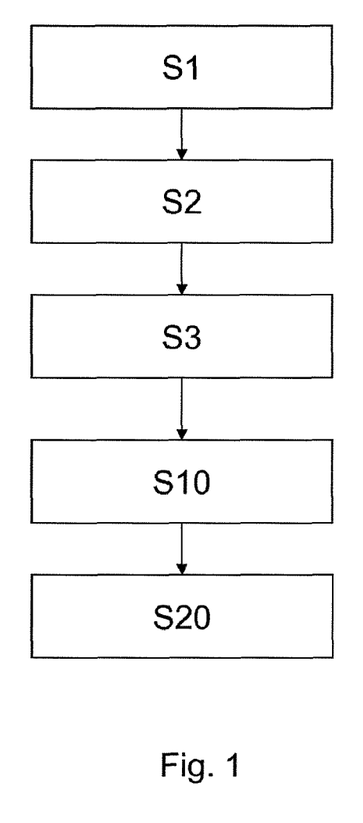
FIG. 1 shows the flowchart of a measurement procedure according to an embodiment of the invention.

FIG. 1 represents a flowchart comprising 5 steps of a procedure for measuring the geometric structure of a component according to an embodiment of the invention. In what follows, these five steps are explained and detailed in respect of the measurement of the geometric structure of an ophthalmic lens comprising a first face 10, for example convex, and a second face 20, for example concave.

Advantageously, the optical component is an ophthalmic lens. Advantageously, the optical component is a progressive ophthalmic lens.

Figure 2:
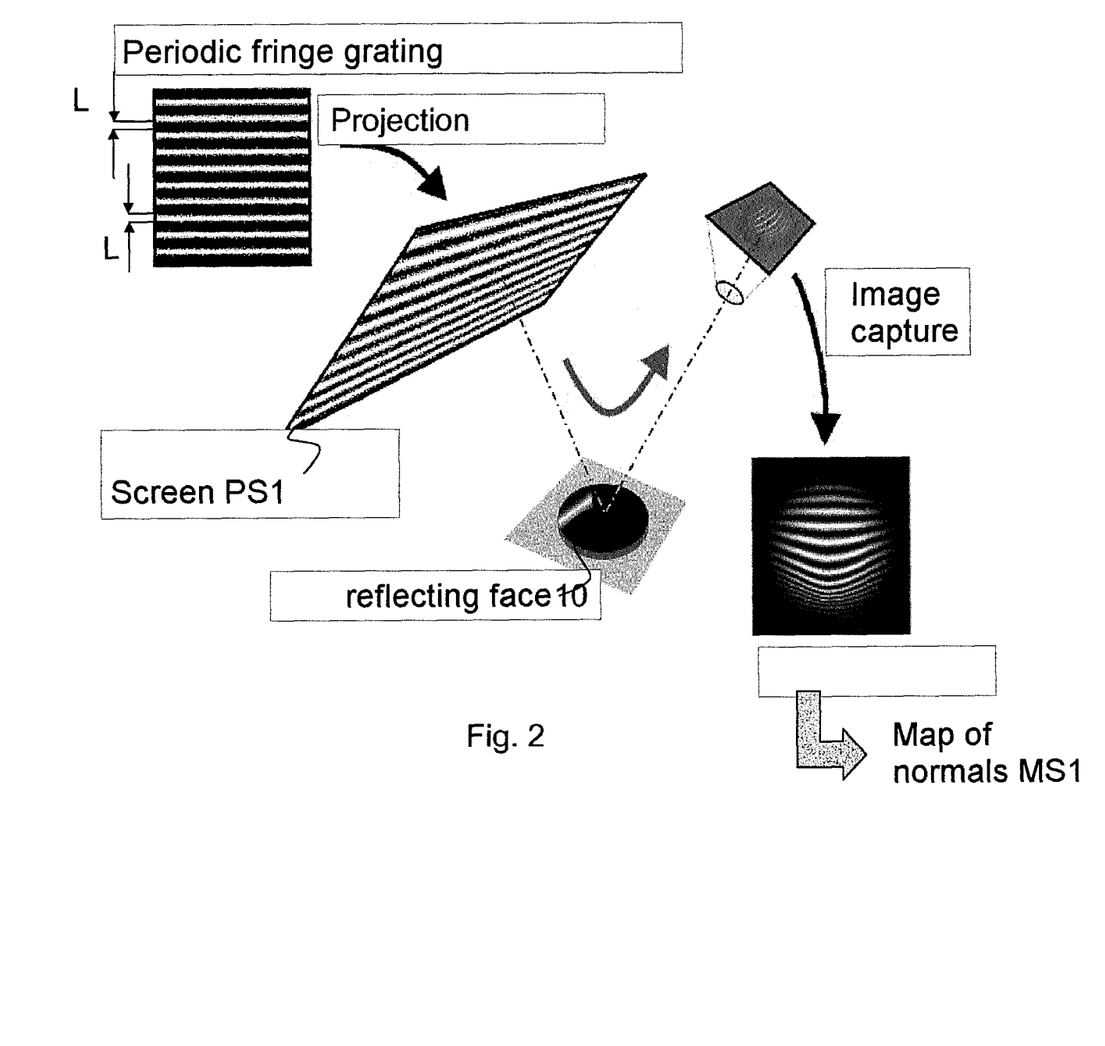
FIG. 2 presents an exemplary measurement of a first signal MS1, implemented in said procedure according to an embodiment of the invention.

Step S1: Measurement of the First Face 10 by a Fringe Reflection Procedure;

As represented in FIG. 2, a periodic fringe grating PS1, consisting for example of luminous bands of width L illuminated uniformly by white light and separated by non-illuminated bands of width L, is projected onto the first face 10 of the component. The fringe grating is reflected by the face 10 and forms a deformed image of the grating. This image is captured by an image capture device, for example a digital camera sensitive to light in the visible spectrum. This image (or set of several images) is used to calculate a map MS1 of the directions normal to the face 10 at a chosen number of its points. Thus the transformation T1 makes it possible to pass from the signal PS1 to a map MS1 of "measured" normals of the face 10. A simulation makes it possible to obtain a first absolute estimation ES1 of the normals for a known initial face. Employing the qualifier "absolute" is meant to indicate that the estimation makes it possible to access a result without ambiguity. Such is not the case, for example in respect of an interferometric measurement in terms of geometry of reflection on the first face, carried out at a wavelength λ. Since this type of measurement is based on a phase variation measurement, its simulation makes it possible to access only a map of the heights of the first face which is ambiguous, modulo λ: the estimation in this case is not absolute. The map MS1 of the measured normals constitutes the target of a reconstruction problem which is solved by optimization in the subsequent step S10 on the basis of the knowledge of the simulation making it possible to obtain the first absolute estimation.

Of course, the present invention is not limited to the embodiment described by way of example; thus, to measure the first signal MS1 it is possible to use procedures other than the reflection fringe deflectometry such as for example a projection fringe deflectometry procedure or by using a Ronchi grating.

Advantageously, the measurement of the first signal MS1 is a zonal or multipoint measurement. More precisely, a measurement of a signal MS1 resulting from a first transformation of a probe signal by, simultaneously, a plurality of points of the first face of the optical component is here termed "zonal" or "multipoint".

In a first embodiment, the first face 10 is illuminated by a fringe grating and the extent of this grating is greater than the size of the first face 10. Thus the zonal measurement makes it possible to measure the entirety of the face 10 in a single, fast and simple step.

Advantageously, the zonal measurement can be obtained by a collection of elementary zonal measurements carried out for example with a fringe grating as described above, illuminating only a fraction of the first surface that will be dubbed the "elementary zone". The elementary zonal measurement measures the signal arising from the reflection of the fringe grating by the elementary zone. The elementary zonal measurements are repeated until the elementary zones cover the whole of the first face. The zonal measurement is obtained by joining up the various elementary zonal measurements.

An example of this second embodiment for a zonal measurement carried out on the basis of two elementary zonal measurements can be described as follows: the first face 10 is illuminated by a fringe grating whose extent is less than the total surface of the first face 10. Let us consider for example that the fringe grating covers 60% of the surface of the first face 10. A first elementary zonal measurement is carried out as indicated hereinabove on a first elementary zone Z1 corresponding to the 60% of the first face covered by the grating for a first position of the first face with respect to the grating. To measure the whole of the first face 10, said first face 10 is thereafter displaced with respect to the grating so that the latter is projected onto another portion of the face 10 and covers a second elementary zone Z2, for example a zone still covering 60% of the surface of the first face, but where the elementary zones Z1 and Z2 overlap over an area corresponding to 20% of the total area of the first face. To perform these two elementary zonal measurements, it is also possible to displace a measurement head projecting the probe signal onto the second elementary zone after having projected it onto the first zone Z1. Finally, a joining up of the two elementary zonal measurements is carried out so as to constitute the measurement of the first signal SM1 on the basis of the probe signal constituted by the fringe grating. The joining up is performed numerically by seeking to maximize the autocorrelation function of the signal SM1 over the zone of overlap between the two elementary zones Z1 and Z2. In this case, a single constraint comes in: it is necessary that the zone of overlap between the elementary zones contains sufficient information to obtain a good autocorrelation function.

This overlap between the elementary zones is not indispensable in the case where the first face 10 is provided with reference frame, optical or mechanical, making it possible to easily position one of the elementary zonal measurements with respect to the other such as for example for a unifocal lens. Preferably, the number of the elementary zonal measurements making it possible to carry out a zonal measurement of one of the faces of the component does not exceed 10.

This second embodiment, which is not limited to the type of fringe grating reflection measurement, presents the advantage of making it possible to carry out a zonal measurement in several captures, for certain applications of allowing measurement of a face of large surface area with one and the same probe signal, or else of obtaining a still greater precision in the zonal measurement.

Figure 3:
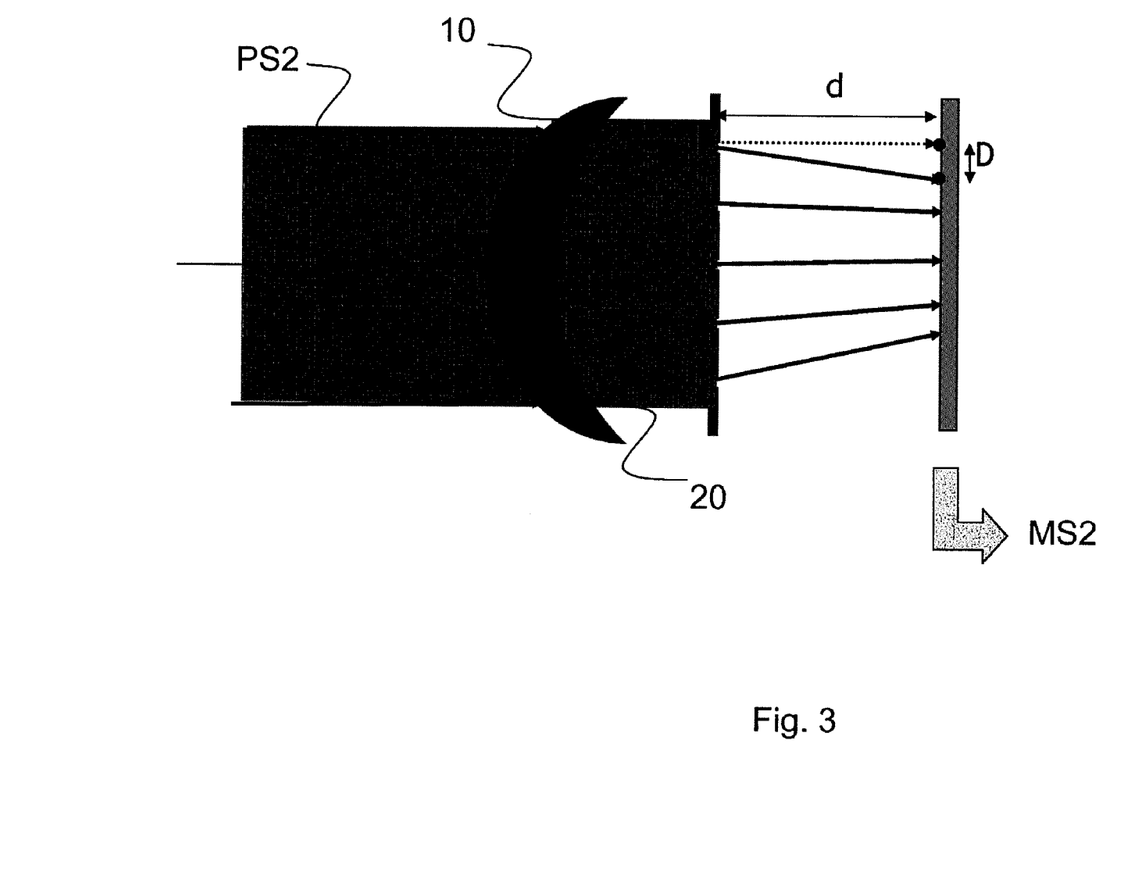
FIG. 3 presents an exemplary step of measuring a second signal MS2, implemented in said procedure according to an embodiment of the invention.

Step S2: Measurement in Transmission, Through the First and the Second Face by a Procedure of Hartmann Type:

As represented in FIG. 3, an optical beam with parallel rays PS2 is sent through the faces 10 and 20 of the component to be measured. The rays constituting the beam undergo a deviation related to the refraction at the two interfaces 10, 20 of the component. A portion of the rays thus deviated thereafter passes through a matrix of openings to form secondary beams which are finally intercepted by a screen. An image of the screen is captured by an image capture device, for example a digital camera sensitive to light in the visible spectrum; the shifts of the secondary beams translated into deviations of the incident light rays characteristic of the optical effect of the measured component are acquired. By a known processing carried out on the captured image, these shifts are translated into a map MS2 of the normals to the wavefront transmitted by the component. Thus the transformation T2 makes it possible to pass from the signal PS2 to a map MS2 of "measured" deviations.

The knowledge of the deviation of the rays is associated with a modeling of the behavior of the measurement system of Hartmann type. Based on this modeling, a simulation of the deviation of the light rays by a component possessing two known faces makes it possible to obtain an absolute estimation of the deviations which is obtained for this component. The second measurement implemented is singular in that a simulation of its operation makes it possible to access an absolute estimation of the faces of the component. The map MS2 of the measured deviations constitutes the target of a reconstruction problem which is solved by optimization in the subsequent step S20.

Of course, the present invention is not limited to the embodiment described by way of example; thus, to measure the second signal MS2 it is possible to use procedures other than transmission Hartmann deflectometry such as for example a Schlieren based or transmission fringe based, Shack-Hartmann deflectometry procedure.

In a first embodiment, the first signal MS1 results from the first transformation of the first probe signal PS1 by said first face 10; and the second signal MS2 results from the second transformation of the second probe signal PS2 by said first face 10 and said second face 20.

In a second embodiment, the first signal MS1 results from the first transformation of the first probe signal PS1 by said first face 10; and the second signal MS2 results from the second transformation of the second probe signal PS2 by said second face 20.

Advantageously, the first and/or the second probe signal PS1, PS2 is an optical signal.

Advantageously, the first signal MS1 is a map of normals to the first face 10 obtained by deflectometry measurement of an optical signal consisting of a periodic grating reflected by the first face 10 and step S2 of measuring the second signal MS2 is a deflectometry measurement of an optical signal transmitted by the first and the second face 10, 20.

Advantageously: step S1 of measuring the first signal MS1 is a measurement of deformation of an optical signal reflected by the first face 10 and step S2 of measuring the second signal MS2 is a measurement of enlargement, or magnification, of an optical signal transmitted by the first and the second face 10, 20.

Advantageously, the measurement of the second signal MS2 is a zonal measurement.

Advantageously the measurement of the first signal MS1 and the measurement of the second signal MS2 are zonal measurements.

Advantageously said zonal measurement is carried out by means of a collection of elementary zonal measurements, where said elementary zonal measurements each measure an elementary signal resulting from a transformation of a probe signal by an elementary zone of the face (or of the faces), so that said elementary zones cover the entirety of said face (or of said faces). Advantageously, the measurement steps S1, S2 are implemented by a single apparatus.

Step S3: Determination of a Third Transformation Making it Possible to Pass from the First Reference Frame R1 to the Second Reference Frame R2

When the measurement of the first signal MS1 in a reference frame R1 is carried out by reflection on the first face 10, only a reconstruction of the first face 10 is achievable on the basis of this first measurement SM1. The measurement MS2 of the second face is carried out in a reference frame R2. It is necessary to know a transformation for passing from the reference frame R1 to the reference frame R2. The step of reconstructing the second face 20 on the basis of a second measurement MS2 carried out in transmission does not in general by itself make it possible to position and to orient the second estimated (or reconstructed) face with respect to the first estimated face. The knowledge of a third transformation making it possible to pass from a first reference frame R1 tied to the measurement of the first signal MS1 to a second reference frame R2 tied to the measurement of the second signal MS2 is necessary in order to achieve this.

Here, reference frame R1, R2 is understood to mean reference frame of an affine space, defined by an origin and 3 independent directions. The third transformation is therefore an affine transformation which can therefore be defined by means of a vector which separates the origin of R1 and the origin of R2 and of a rotation matrix of order 3 for expressing the rotations necessary to pass from the axes of the reference frame R1 to the axes of the reference frame R2.

For the present embodiment, the knowledge of the third transformation entails a determination which is independent of the measurement of the first and of the second signal MS2.

Figure 4:
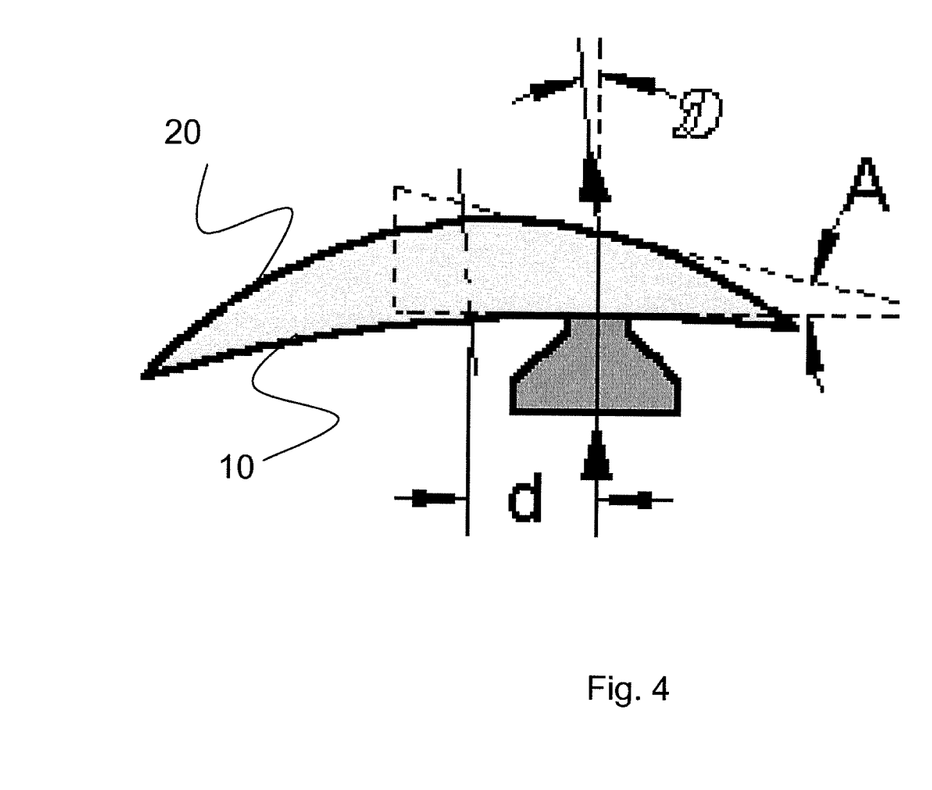
FIG. 4 presents an exemplary step of determining a third transformation implemented in said procedure according to an embodiment of the invention.

As represented in FIG. 4, the third transformation can be determined at a reference point: the thickness at the center of the component is measured for example with the aid of a system with mechanical or optical gauging. This makes it possible to ascertain the distance between the faces 10 and 20 of the component at this reference point.

Step S3 depends on the type of measurement performed in steps S1 and S2.

Indeed, if the measurement of steps S1 and S2 relates to altitudes (for example in mechanical gauging), the information available is sufficient to reconstruct the face entirely.

If the measurement relates to data of order one (for example normals, or optical deviations), there is an indeterminacy and the reconstruction may not take place without giving the altitude of a point of the face (the reconstruction problem has an infinity of solutions). To solve this problem, a measurement of the thickness at the center of the component makes it possible to position in the space the face to be reconstructed.

In the case of a measurement of order 2 (for example a measurement of curvature, or of magnification) there are two indeterminacies. It is necessary to give an altitude at a point of the face and a normal at a point of the face to guarantee the uniqueness of the solution. Thus, it is possible to measure the thickness at the center of the component to determine the altitude of the second face, as well as the prism of the component which will indicate a normal to the second face.

If the prism is measured by an optical means with the aid of an incident ray normal to the first face, then the prism measurement can be translated directly as transformation between the first face and the second face. If the prism measurement is performed by an incident ray which is not normal to the first face, then the prism depends on the second face. It is therefore necessary to simultaneously reconstruct the second face and the orientation of the second face in space (the altitude being given by the measurement of the center thickness). In the latter situation, step S20 described below, leads to a simultaneous determination of the third transformation and of the second face 20. Of course, the present invention is not limited to the embodiment described by way of example; thus, to determine the third transformation it is possible to use procedures other than the transmission optical procedures mentioned such as for example a mechanical gauging based or else optical gauging based, reflection optical procedure.

The measurement steps S1, S2 are carried out on different measurement apparatuses. This necessitates a common measurement datum to position the component in space in an absolute manner. For the present embodiment, the first and the second measurements can each be carried out with the aid of a tag system of micro-circles which are carried on one of the faces of the component or alternatively by virtue of a common mechanical datum between the measurement systems which then guarantees a positioning in an equivalent reference frame in each of them. Accordingly, use is made for example of: an auto-centered mechanical claw referenced in space. According to one embodiment, the step (S3) of determining the third transformation comprises a measurement of thickness of the component.

According to one embodiment, the step (S3) of determining the third transformation furthermore comprises a measurement of the prism of the component.

Step S10: Estimation of the First Face 10 Carried Out in Particular on the Basis of the First Signal MS1.

A first reconstruction is aimed at estimating the first face 10 of the component. A first virtual face 11 is considered, positioned in space under the same conditions (position and orientation) as the first face 10 of the physical component during the fringe grating deformation measurement. The reference frame in which the measurement MS1 is carried out and in which the position of the first face 10 and the position of the first virtual face 11 is known is called R1.

The principle of reconstruction by optimization is known per se.

Starting values are defined for the first virtual face 11, for example a spherical shape. The simulation of the transformation of the signal PS1 by the virtual face 11 makes it possible to calculate an estimation ES1 of the normals of the virtual face 11.

A cost function V1 is then defined, able to be calculated for current values of the virtual face 11 of the component; this cost function V1 is devised so as to exhibit a minimum or maximum value when the values of the estimation ES1 of the measurement carried out with the virtual face 11 are equal to the values of the measurement MS1.

The value of the cost function makes it possible to quantify the discrepancy between the simulation of the measurement ES1 and the measurement MS1. For each measurement point, it is possible to consider the norm of the vector equal to the difference between the vector indicating the normal which arises from the measurement and the vector indicating the normal which arises from the simulation. A cost function may be the quadratic sum of the norms of the vectors for all measurement points.

Thereafter, an iterative optimization algorithm modifies the virtual face 11 so as to decrease the cost function V1. For example a least squares algorithm such as Gauss-Newton, or Levenberg-Marquardt, described in "Numerical Optimization", Bonnas et al., Springer 2003, is employed. At each iteration, the algorithm proposes a new virtual face 11; the simulation of the transformation T1 by this new virtual face 11 makes it possible to calculate a new value V1 of the cost function.

The iterative process is interrupted for example when a stopping criterion is satisfied for example when the value taken by the cost function V1 can no longer be decreased, or else when the value of the cost function V1 is less than a given threshold. We then have a virtual face 11 which is a correct estimation of the measured face 10 since the discrepancy between the measurement and the simulation of this measurement via the transformation T1 is reduced.

Step S20: Estimation of the Second Face 20 Carried Out in Particular on the Basis of the First Signal MS2.

A virtual component is constructed, whose first face is the result of the reconstruction of the first face 10 estimated on the basis of the measurement MS1, and whose second face is a second virtual face 21. The third transformation determined in step S3 is the law for passing from the reference frame R1 in which the first estimated face is expressed to the reference frame R2 in which is the position of the second face 20 is referenced in the course of the measurement carried out in step 2. This third transformation makes it possible to construct the virtual component in space and to place it virtually under the same conditions as the component (the physical part) in the course of the measurement carried out in step S2.

The simulation of the transformation T2 of the signal PS2 by this initial virtual component to calculate an estimation of a second signal, that is to say one knows how to obtain by the calculation a map of deviation (of the secondary beams of the probe signal PS2) which are produced by the virtual component.

For each point of this deviation map, it is possible to consider the norm of the vector equal to the difference between the measured deviated vector and the simulated deviated vector. A cost function may be the quadratic sum of these norms.

Thereafter, an iterative optimization algorithm modifies the virtual face 21 of the component so as to decrease the value of the cost function V2. A least squares algorithm such as Gauss-Newton, or Levenberg-Marquardt ("Numerical Optimization", Bonnas et al., Springer, 2003) can be used for this purpose. At each iteration, the algorithm proposes a new virtual face 21; the simulation of the transformation T2 by this new face 21 makes it possible to calculate a new value V2 of the cost function. The iterative process stops for example when the value of the cost function can no longer be decreased, or else when the value of the cost function is less than a given threshold. We then have a virtual face 21 which is an estimation E2 of the measured face 20 since the discrepancy between the measurement and the simulation of this measurement via the transformation T2 is small.

Advantageously, each estimation step SW, S20 is iterative, each iteration consisting in:
a Executing the simulation SIM1, SIM2 on the basis of at least one virtual face 11, 21 and of the probe signal PS1; PS2 to obtain an estimation ES1, ES2 of the measured signal;
b Measuring the discrepancy between the estimation ES1, ES2 calculated in step a and the measured signal MS1; MS2 by means of the cost function V1, V2;
c If a stopping criterion the discrepancy measured in step b is not satisfied, modifying the virtual face 11; 21 so as to reduce said discrepancy and return to step a;
d Estimating the face 10, 20 as the value of the virtual face 11; 21 taken into account in step a of the present iteration.

Advantageously, the estimation 21 of said second face 20 is obtained furthermore on the basis of the estimation 11 of said first face 10.

Advantageously, the estimation steps S10, S20 comprise a step where the virtual face 11, 21 is expressed in an analytical form. The advantage constituted by this step is to accelerate the calculations, and ultimately to provide an estimation of the geometric structure of the component in a form which is readily manipulatable during subsequent numerical calculations.

Figure 5:
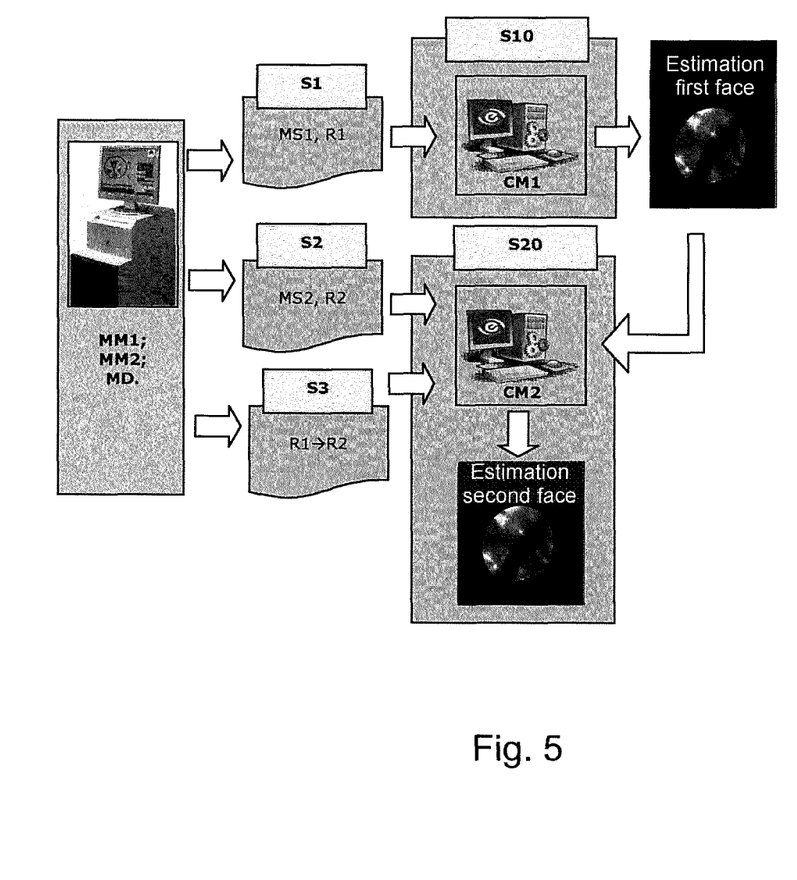
FIG. 5 presents schematically an embodiment of a system for measuring the structure of a component according to an embodiment of the invention.

FIG. 5 represents in a schematic manner a system for measuring the geometric structure of a component delimited by a first face face10face and a second face face20face; said system comprising
- a first measurement means MM1 for measuring a first signal MS1 resulting from a first transformation of a first probe signal PS1 by at least said first face 10, a first simulation of said first transformation making it possible to obtain a first estimation ES1 of the signal resulting from said first transformation of the first probe signal PS1 by at least one first virtual face 11 which is known and positioned in a first measurement reference frame R1 in a manner identical to said first face 10 during the measurement of the first signal MS1;
- a second measurement means MM2 for measuring a second signal MS2 resulting from a second transformation of a second probe signal PS2 by at least said second face 20, a second simulation of said second transformation making it possible to obtain a second estimation ES2 of the signal resulting from said second transformation of the second probe signal PS2 by at least one second virtual face 21 which is known and positioned in a first measurement reference frame R2 in a manner identical to said second face 20 during the measurement of the second signal MS2;
- a means MD for determining a third transformation making it possible to pass from the first reference frame R1 to the second reference frame R2
- a first calculation means CM1 configured to estimate said first face 10 on the basis of the first signal MS1, of said first simulation, of a first virtual face 11 and of a first cost function V1 quantifying a discrepancy between the first estimation ES1 and the first signal MS1;
- a second calculation means CM2 configured to estimate said second face 20 on the basis of the second signal MS2, of said second simulation, of a second virtual face 21, of said third transformation and of a second cost function V2 quantifying a discrepancy between the second estimation ES2 and the second signal MS2.

In the example represented in FIG. 5, the estimation of the first surface 10 serves for the estimation of the second surface 20. Advantageously, the first calculation means CM1 carries out a measurement of deformation of an optical signal reflected by the first face 10; and the second calculation means CM2 carries out a measurement of enlargement or magnification of an optical signal transmitted by the first and the second face 10, 20.

Alternatively, the first calculation means (CM1) produces a map of normals to the first face (10) obtained by deflectometry measurement of an optical signal consisting of a periodic grating reflected by the first face (10); and
- the second calculation means (CM2) carries out a deflectometry measurement of an optical signal transmitted by the first and the second face (10, 20).

Advantageously, a system according to an embodiment of the invention comprises measurements means MM1, MM2 of an optical measurement system which is configured to carry out measurements of faces 10, 20 of an optical component expressed in a reference frame specific to said system.

Advantageously, at least one of said measurement means MM1, MM2 carries out a zonal measurement.

Advantageously, said first and second measurement means MM1, MM2 carry out a zonal measurement.

One of the applications of this measurement of the geometric structure to an ophthalmic lens can be the comparative analysis of a lens after machining with a nominal part for example so as to study the conformity of the part produced.

It is necessary accordingly to define an absolute datum common to the ophthalmic lens measured and to the nominal part. Accordingly, the measured ophthalmic lens and the nominal part are referred to a common datum, for example tied to the part where the measurement is carried out. The position of the measured ophthalmic lens and of the nominal part in the measurement datum is then determined either by the association of a mechanical reference frame on the lens and the part, such as for example a flat, or by the permanent tagging of markings on the lens and the part, of the microcircles type.

In the foregoing, the reference to "an embodiment" signifies that a particular characteristic, the structure, or a characteristic described in conjunction with the embodiment may be included in at least one implementation of the invention. The appearances of the expression "in an embodiment" at various places in the foregoing detailed description do not necessarily all refer to the same embodiment. Likewise, distinct or alternative embodiments are not necessarily mutually exclusive of other embodiments.

The invention claimed is:

1. A method for measuring the geometric structure of an optical component delimited by a first face and a second face; said method comprising the steps of:
   - (S1) measurement of a first signal resulting from a first transformation of a first probe signal by said first face, a first simulation of said first transformation being used to obtain a first absolute estimation of the signal resulting from said first transformation of the first probe signal by a first virtual face which is known and positioned in a first measurement reference frame in a manner identical to said first face during the measurement of the first signal;
   - (S2) measurement of a second signal resulting from a second transformation of a second probe signal by at least said second face, a second simulation of said second transformation being used to obtain a second absolute estimation of the signal resulting from said second transformation of the second probe signal by at least one second virtual face which is known and positioned in a second measurement reference frame in a manner identical to said second face during the measurement of the second signal, where at least one of the measurements from the measurement of the first signal and the measurement of the second signal is a zonal measurement;
   - (S3) determination, using a processor, of a third transformation to pass from the first reference frame to the second reference frame;
   - (S4) estimation, using the processor, of said first face carried out on the basis of the first signal, of said first simulation and of a first cost function quantifying a discrepancy between the first estimation and the first signal; and
   - (S5) estimation, using the processor, of said second face carried out on the basis of the second signal, of said second simulation, of said third transformation and of a second cost function quantifying a discrepancy between the second estimation and the second signal.

2. The method as claimed in claim 1, wherein the measurement of the first signal and the measurement of the second signal are zonal measurements.

3. The method as claimed in claim 1, wherein said zonal measurement is carried out by means of a collection of elementary zonal measurements, where said elementary zonal measurements each measure an elementary signal resulting from a transformation of a probe signal by an elementary zone of the face (or of the faces), so that said elementary zones cover the entirety of said face.

4. The method as claimed in claim 1, wherein: the first signal results from the first transformation of the first probe signal by said first face; and the second signal results from the second transformation of the second probe signal by said first face and said second face.

5. The method as claimed in claim 1, wherein: the first signal results from the first transformation of the first probe signal by said first face; and the second signal results from the second transformation of the second probe signal by said second face.

6. The method as claimed in claim 1, wherein each estimation step (S4, S5) is iterative, each iteration comprising:
 a) executing the simulation on the basis of at least one virtual face and of the probe signal so as to obtain an estimation of the measured signal;
 b) measuring the discrepancy between the estimation calculated in step a) and the measured signal by means of the cost function;
 c) if a stopping criterion the discrepancy measured in step b) is not satisfied, modifying the virtual face (11; 21) so as to reduce said discrepancy and return to step a); and
 d) estimating the face as the value of the virtual face (11; 21) taken into account in step a) of the present iteration.

7. The method as claimed in claim 1, wherein said second estimation is obtained furthermore on the basis of said first estimation.

8. The method as claimed in claim 1, wherein the first and/or the second probe signal is an optical signal.

9. The method as claimed in claim 1, wherein: the first signal is a map of normals to the first face obtained by deflectometry measurement of an optical signal consisting of a periodic grating reflected by the first face; and the step (S2) of measuring the second signal is a measurement by deflectometry of an optical signal transmitted by the first and the second face.

10. The method as claimed in claim 1, wherein: the step (S1) of measuring the first signal is a measurement of deformation of an optical signal reflected by the first face; and the step (S2) of measuring the second signal is a measurement of magnification of an optical signal transmitted by the first and the second face.

11. The method as claimed in claim 1, wherein the step (S3) of determining the third transformation comprises a measurement of thickness of the component.

12. The method as claimed in claim 11, wherein the step (S3) of determining the third transformation furthermore comprises a measurement of the prism of the component.

13. The method as claimed in claim 1, wherein the measurement steps (S1, S2) are implemented by a single apparatus.

14. The method as claimed in claim 1, wherein the optical component is an ophthalmic lens.

15. The method as claimed in claim 1, wherein said zonal measurement is carried out by means of a collection of elementary zonal measurements, where said elementary zonal measurements each measure an elementary signal resulting from a transformation of a probe signal by an elementary zone of the face, so that said elementary zones cover the entirety of said faces.

16. A system for measuring the geometric structure of an optical component delimited by a first face and a second face, said system comprising:
 a first measurement apparatus which measures a first signal resulting from a first transformation of a first probe signal by said first face, a first simulation of said first transformation being used to obtain a first absolute estimation of the signal resulting from said first transformation of the first probe signal by a first virtual face which is known and positioned in a first measurement reference frame in a manner identical to said first face during a measurement of the first signal;
 a second measurement apparatus which measures a second signal resulting from a second transformation of a second probe signal by at least said second face, a second simulation of said second transformation being used to obtain a second absolute estimation of the signal resulting from said second transformation of the second probe signal by at least one second virtual face which is known and positioned in a first measurement reference frame in a manner identical to said second face during a measurement of the second signal;
 wherein at least one of said first and second measurement apparatuses carries out a zonal measurement;
 at least one processor which determines a third transformation to pass from the first reference frame to the second reference frame;
 wherein the at least one processor performs a first calculation to estimate said first face on the basis of the first signal, of said first simulation, of a first virtual face and of a first cost function quantifying a discrepancy between the first estimation and the first signal; and
 wherein the at least one processor performs a second calculation to estimate said second face on the basis of the second signal, of said second simulation, of a second virtual face, of said third transformation and of a second cost function quantifying a discrepancy between the second estimation and the second signal.

17. The system as claimed in claim 16, wherein each of said first and second measurement apparatuses means carries out a zonal measurement.

18. The system as claimed in claim 17, wherein: the at least one processor, in performing the first calculation carries out a measurement of deformation of an optical signal reflected by the first face; and the at least one processor, in performing the second calculation carries out a measurement of magnification of an optical signal transmitted by the first and the second face.

19. The system as claimed in claim 18, wherein: the at least one processor, in performing the first calculation produces a map of normals to the first face obtained by deflectometry measurement of an optical signal consisting of a periodic grating reflected by the first face; and the at least one processor, in performing the second calculation carries out a measurement by deflectometry of an optical signal transmitted by the first and the second face.

* * * * *